Figure 8:
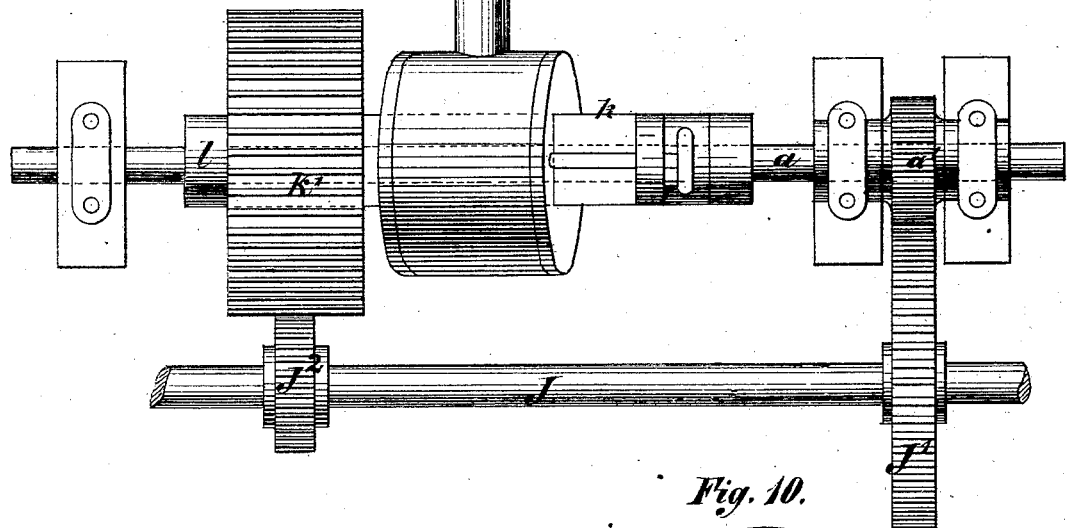

W. T. HAMILTON.
Mechanisms for Producing and Transmitting Reciprocating Motions.
No. 155,943. Patented Oct. 13, 1874.
4 Sheets--Sheet 1.
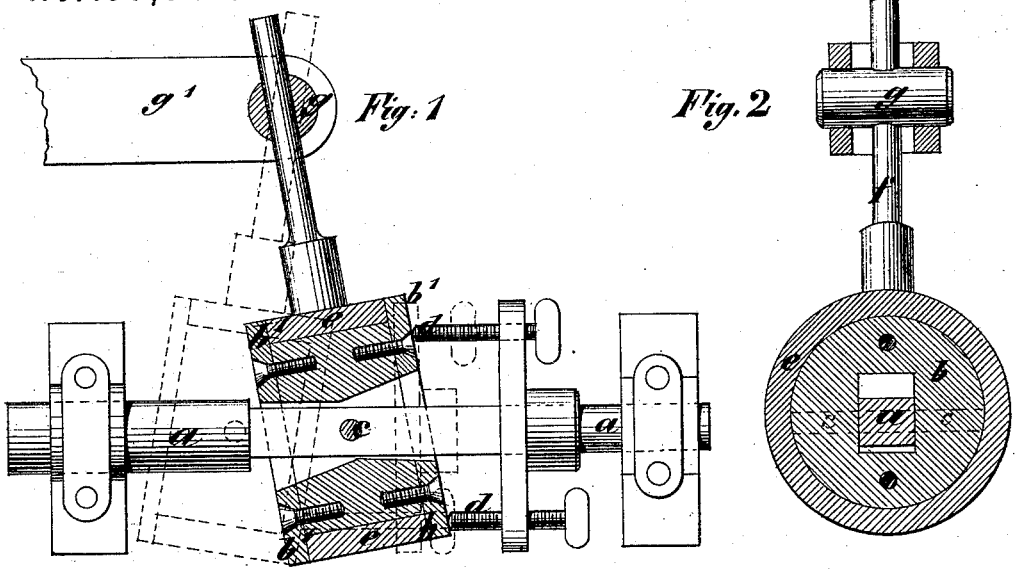
Fig. 1. Fig. 2.
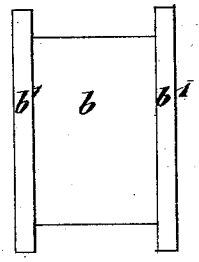 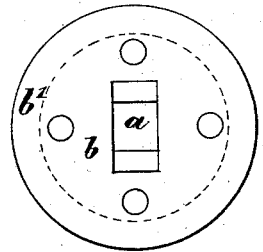
Fig. 3. Fig. 4.
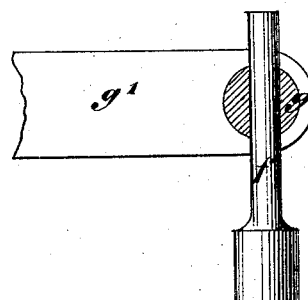
Fig. 11.
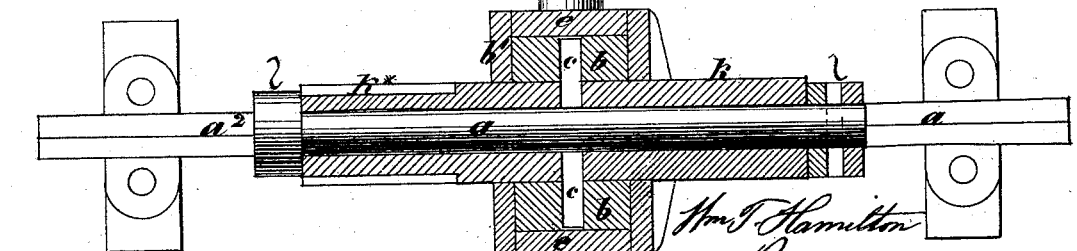
Witnesses:
Fred Haynes
Ferd Lusch
Wm. T. Hamilton
per Ronn & Allen
Attorneys W. T. HAMILTON.
Mechanisms for Producing and Transmitting
Reciprocating Motions.
No. 155,943. Patented Oct. 13, 1874.
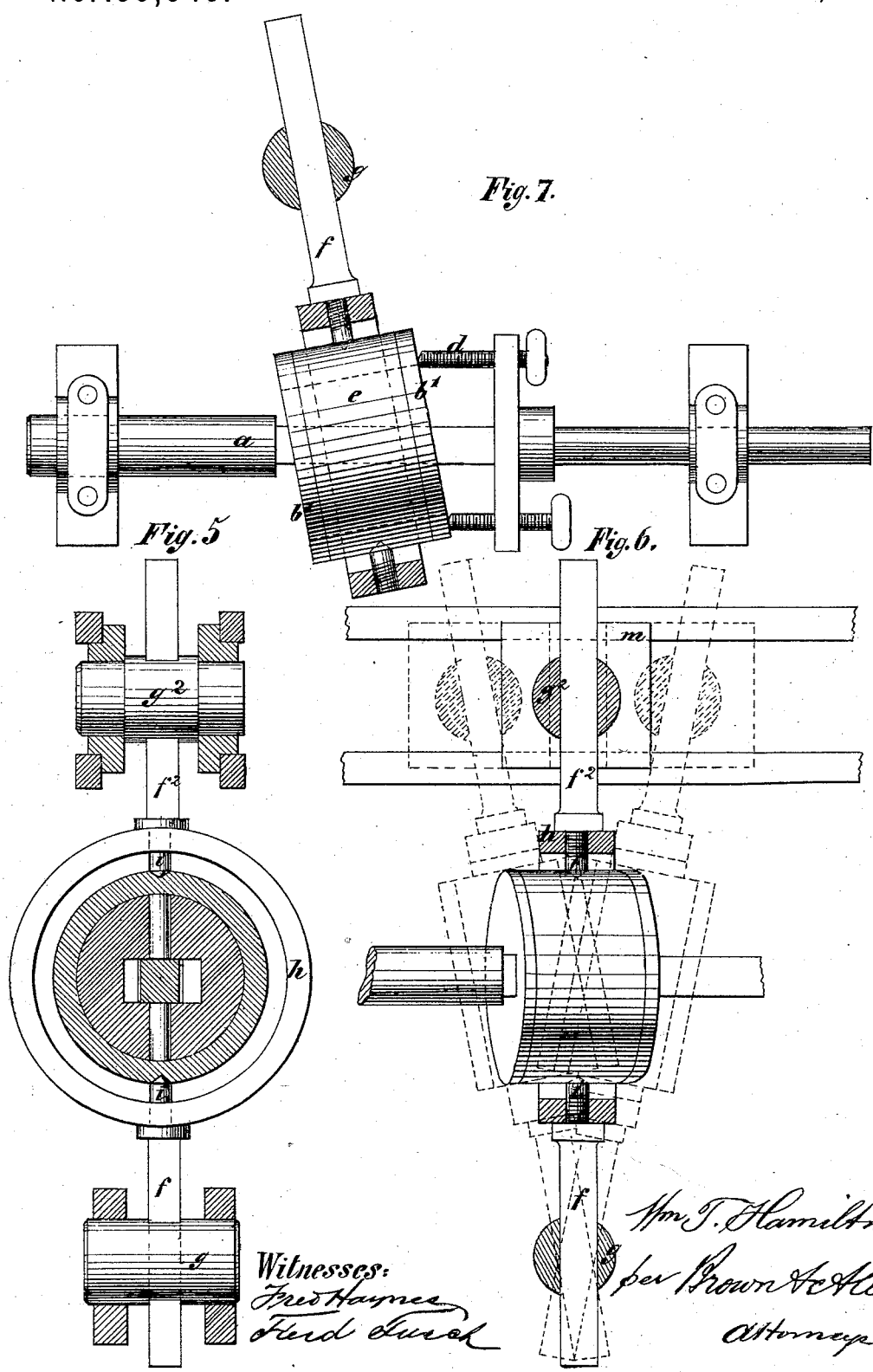

W. T. HAMILTON.
Mechanisms for Producing and Transmitting Reciprocating Motions.

No. 155,943. Patented Oct. 13, 1874.

Witnesses: Wm. T. Hamilton
per Brown & Allen
Attorneys

THE GRAPHIC CO. PHOTO-LITH.39 & 41 PARK PLACE,N.Y.

W. T. HAMILTON.
Mechanisms for Producing and Transmitting Reciprocating Motions.
No. 155,943. Patented Oct. 13, 1874.
4 Sheets--Sheet 4.
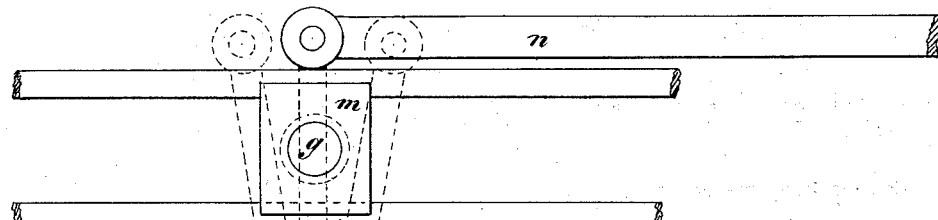
Fig: 12.
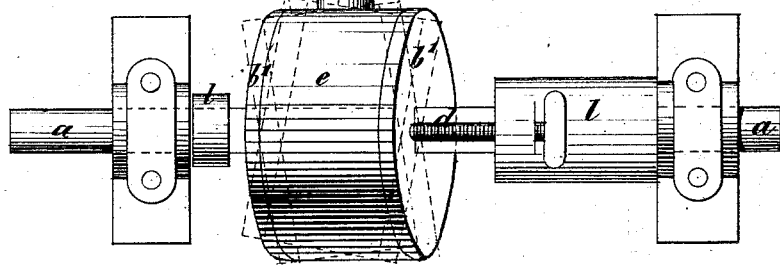
Fig: 13.
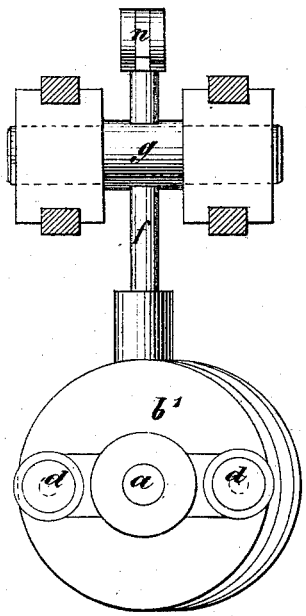
Fig: 14.
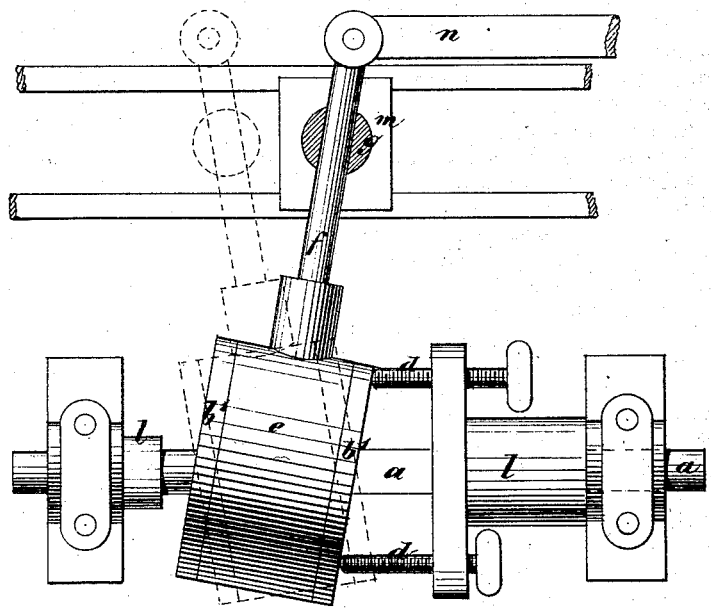
Witnesses:
Fred Haynes
Ferd Lusch
Wm. T. Hamilton
per Brown & Allen
Attorneys
THE GRAPHIC CO. PHOTO-LITH. 39 & 41 PARK PLACE, N.Y.

UNITED STATES PATENT OFFICE.

WILLIAM T. HAMILTON, OF RATHMINES, DUBLIN, IRELAND.

IMPROVEMENT IN MECHANISMS FOR PRODUCING AND TRANSMITTING RECIPROCATING MOTION.

Specification forming part of Letters Patent No. 155,943, dated October 13, 1874; application filed March 10, 1873.

*To all whom it may concern:*

Be it known that I, WILLIAM TIGHE HAMILTON, of Rathmines, Dublin, Ireland, barrister at law, have invented certain Improved Mechanism or Apparatus for Producing and Transmitting Reciprocating Motions, of which the following is a specification:

The object of this invention is to cause an axle to perform certain positive motions which are required or will be found convenient in a variety of machines.

The motions which I am able to produce by means of my improved mechanism or apparatus are, first, to cause an axle to reciprocate as it rotates, and at the same rate; secondly, to cause an axle to reciprocate as it rotates, but at a different rate; thirdly, to cause an axle to reciprocate without rotating; or, fourthly, to oblige any link-bar or other object to reciprocate without rotating, and thus to communicate a corresponding motion to any other piece of mechanism.

Various arrangements of my improved mechanism whereby these objects are affected are shown in the accompanying drawings, in which Figure 1, Sheet I, is a longitudinal section of one arrangement for effecting the object of my invention. Fig. 2 is a transverse section of the same.

Upon any part of the axle $a$, to which rotary motion is communicated in any convenient manner, and which should have a portion of its length made square in section, as shown in the drawing, is mounted a circular disk or boss, $b$, (shown detached in front and side elevation at Figs. 3 and 4,) which has a hole through it corresponding with the square shape of the axle. The circular disk or boss $b$ is secured to the axle by a pin, $c$, which passes at right angles through the center of its thickness, and across the squared sides and through the center of the axle, as shown by dots in Fig. 2. The disk can rock or move with freedom on the pin $c$, and can be fixed at any desired angle by means of adjusting-screws $d\,d$, Fig. 1, or other suitable means. A circular strap, $e$, of the same width as the boss, is fitted so as to admit of the boss $b$ and axle $a$ revolving within it, when the strap $e$ is kept in position by two side plates, $b'\,b'$, which are fixed to the ends of the boss. This strap $e$ is arranged on the boss in a similar manner to the strap of an eccentric. A rod, $f$, is fixed into this strap in the center of its thickness, and in a line through the center of the axle $a$, like the rod of an eccentric. The outer end of this rod $f$ is rounded, and passes through a like hole in a round stud, $g$, which works in a like hole in a stationary frame, $g^1$. This stud is thus maintained in a vertical position at right angles to the axle in one direction, as shown at Fig. 2. Then the rod $g$ being kept from rising or falling by its end being inserted in or passed through a slot in the frame $g^1$, it has freedom for a radial or twisting or in-and-out motion, so as to answer to the varying positions of the boss $b$ and strap $e$.

Figure 10:
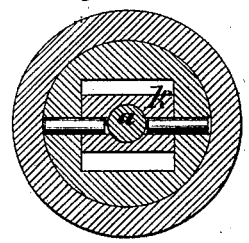
Figure 9:
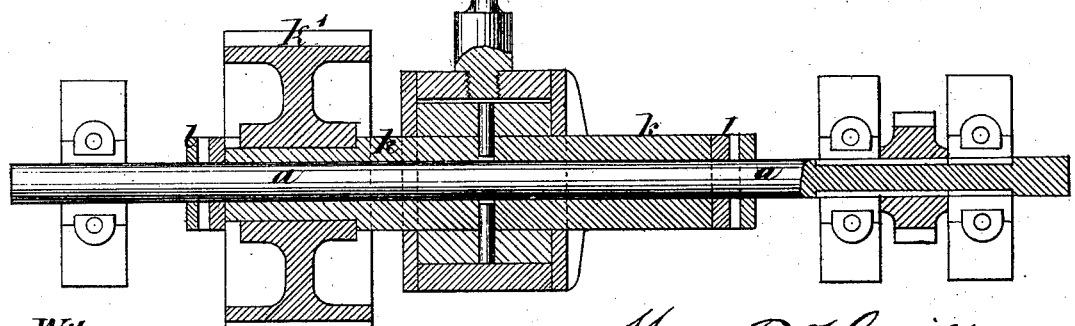

The action of the moving parts as to the several motions will be as follows: First, when the axle $a$ is caused to rotate by any of the usual means, it will be compelled by the inclination of the boss $b$, and the lateral leverage of the rod $f$, acting in the stud $g$, to reciprocate or move endwise as it rotates, as indicated by the dotted lines in Fig. 1. It will thus reciprocate at the same rate as it rotates—that is to say, for every complete rotation of the shaft or axle $a$ it will move twice to and fro in its bearing with a throw proportioned to the inclination of the rod $f$, and the distance of the axle $a$ from the stud $g$. The mounting of the rod $f$ may be modified by placing a concentric hoop, $h$, outside of the strap $e$, but pivoted to it at opposite sides, as at $i\,i$, so that they may swivel on each other. This arrangement is shown at Figs. 5, 6, and 7, Sheet II. The rod $f$ is fixed into this hoop $h$, instead of into the strap $e$, as in Figs. 1 and 2, Sheet I. The rod $f$ is in a line with the pivots $i\,i$. Then, if the outer end of the rod $f$ be made square instead of round, and such end be passed through a like hole in the stud $g$, so as to prevent it from twisting, the hoop $h$ will swing to and fro in vertical planes on its pivots $i\,i$ like a door on its hinges. The motion of the axle $a$ will remain the same as before, provided the stud $g$ remains steady. Second, when it is desired that the rate of reciprocation of the axle shall differ from that of the rotation, the boss $b$ may be mounted upon a sleeve-shaft of the same external shape as that proposed for the axle $a$, but with a circular hole through it, so as to revolve on the axle $a$, which should in this case be cylindrical. This arrangement is shown in detail in Sheet III, in which Fig. 8 is a front elevation of the arrangement complete; Fig. 9 is a longitudinal vertical section, and Fig. 10 is a transverse section. The reciprocating axle $a$ is rotated by means of a spur-wheel, $j^1$, on the counter-shaft $j$, gearing into a pinion $a'$ on the axle $a$. A pinion, $j^2$, on the same shaft $j$, gears into and drives a wide-toothed wheel, $k'$, on the sleeve-shaft $k$. Then, as the two shafts $a$ and $k$ are caused to rotate by independent gearing, the axle $a$ will reciprocate at the rate due to such gearing, but will rotate at the rate due to its own separate gearing. The boss $b$ is adapted to the sleeve-shaft $k$, instead of to the axle $a$, as in the other instance. This axle passes through the sleeve-shaft $k$, and each rotates independently of the other, but as the sleeve-shaft $k$ is mounted between two collars, $l\ l$, fixed on the axle $a$ by means of transverse pins, it follows that any endway or reciprocating motion communicated to the sleeve-shaft $k$, on which the boss $b$ and its appendages are mounted, must be communicated to the axle $a$, although it may be rotating at a different speed. Third, when it is desired that the axle $a$ shall reciprocate without rotating, the mounting on the sleeve-shaft is maintained, but the axle is held in such suitable guides or bearings as will permit reciprocation or endway motion therein, but will prevent rotation. This will be understood by referring to Fig. 11, Sheet I, in which it will be seen that the boss $b\ b$ is adapted to the sleeve-shaft $k$ by cross-pins, which, however, do not enter the axle $a$. The sleeve-shaft $k$ rotates on the axle $a$ between the collars $l\ l$, and is driven by a spur-wheel, taking into the teeth cut at $k$ on the shaft. The ends $a^2\ a^2$ of the shaft $a$ are made square, and they move endwise in square bearings or guides, so that it will not rotate, but as the sleeve-shaft $k$ is provided with the boss and all its appendages, which work in the manner already explained, it follows that the sleeve-shaft $k$ must reciprocate, and must therefore carry the axle $a$ with it. Some of the above motions may be produced by mounting the disk and its accessories on a cranked axle, or rather an axle or stud which is bent out of the line with the main axle. Fourthly, when it is desired that the axle $a$ shall be made to act on any link, bar, or other object, so as to cause the latter to reciprocate, the axle $a$ is left free to rotate, but is prevented from reciprocating by means of collars or shoulders mounted or fixed on it, and made to act against its bearings. This arrangement is shown at Figs. 12, 13, and 14, Sheet IV. The axle $a$ is provided with the collars or shoulders $l\ l$, which are fixed thereon, and rotate against the bearings and prevent the axle from moving endwise. The stud $g$ is then attached to a slide, $m$, or such other object, which will then reciprocate as it slides in suitable guides. To the upper end of the rod $f$, is attached a link or bar, $n$, to which a reciprocating motion may be communicated, as indicated by dots in the drawing. As a modification of this arrangement, the primary stud $g$ may remain stationary, but the axle $a$ will be free to reciprocate and rotate. Then if a second rod, $f^2$, be fixed into the strap $e$ or ring $h$ of Figs. 5, 6, and 7, sheet II, the two rods $f$ and $f^2$ being opposite to each other, will cause any link, bar, or object which carries a like stud, $g^2$, into which it is inserted, to reciprocate with a throw of increased proportions, as indicated in Fig. 6.

Having now set forth the nature of my said invention, and explained the manner of carrying the same into effect, I claim—

The combination with an axle $a$, of an oscillating hub or boss, $b$, adjustable at various angles, a strap, $e$, surrounding said hub or boss, a rod, $f$, connected with said strap, and a stud, $g$, through which said rod works, the whole operating substantially as described, for the purposes set forth.

WM. TIGHE HAMILTON.

Witnesses:
  H. K. WHITE,
    66 *Chancery Lane, London.*
  M. WYNN,
    24 *Royal Exchange, London.*